No. 871,860. PATENTED NOV. 26, 1907.
C. L. BUCKINGHAM.
FILTER FOR SEPARATING SOLUTIONS FROM ORE PULP.
APPLICATION FILED JAN. 9, 1907.
3 SHEETS—SHEET 1.
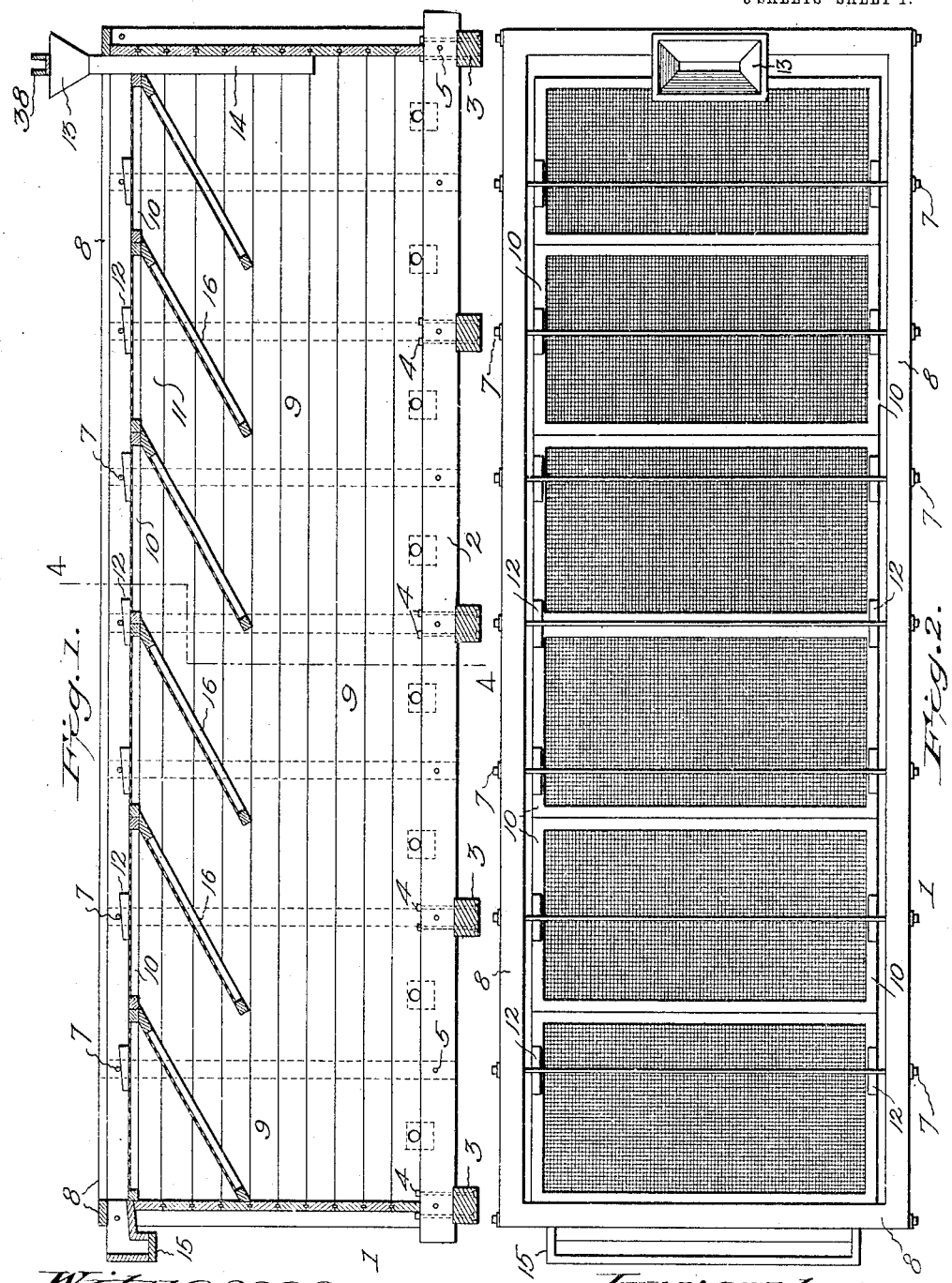

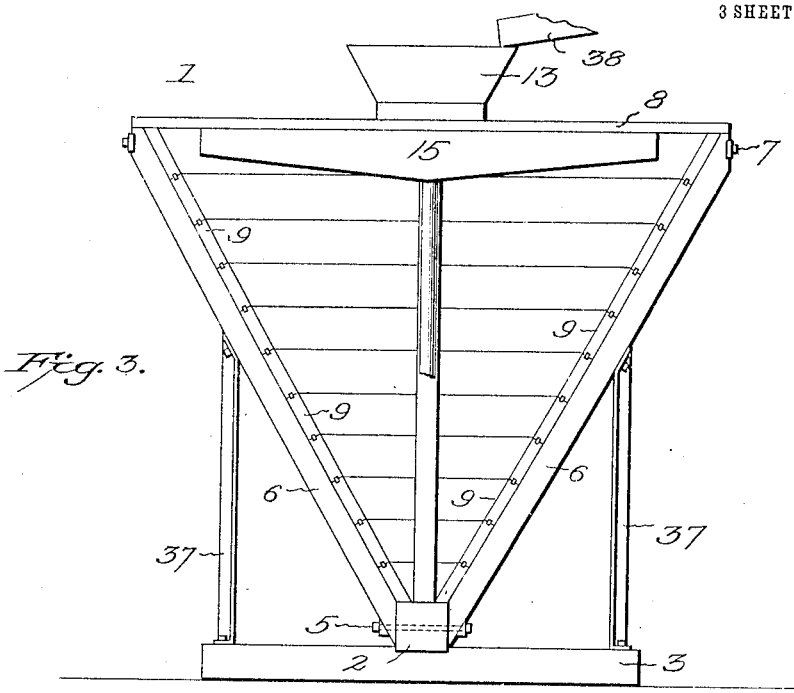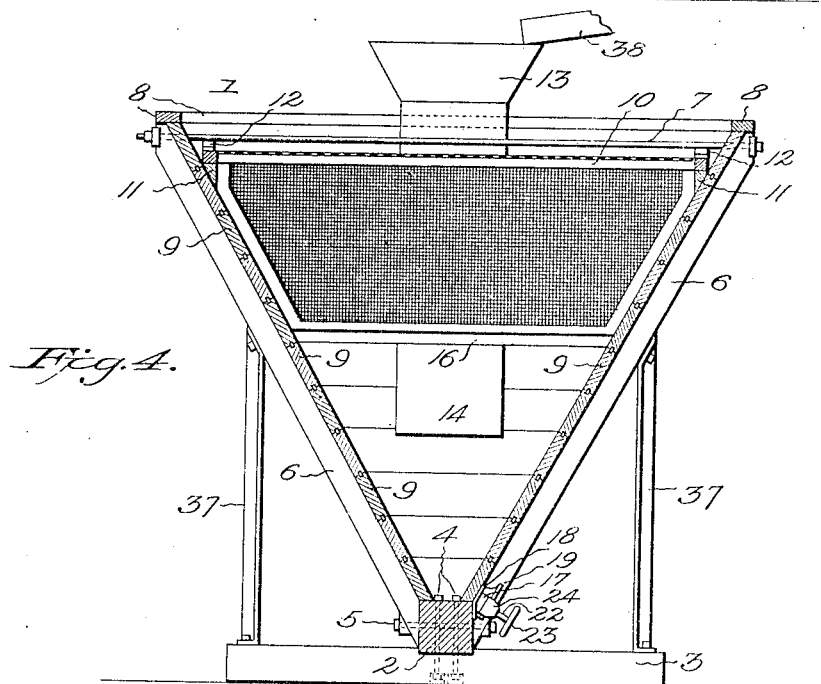

No. 871,860. PATENTED NOV. 26, 1907.
C. L. BUCKINGHAM.
FILTER FOR SEPARATING SOLUTIONS FROM ORE PULP.
APPLICATION FILED JAN. 9, 1907.
3 SHEETS—SHEET 3.
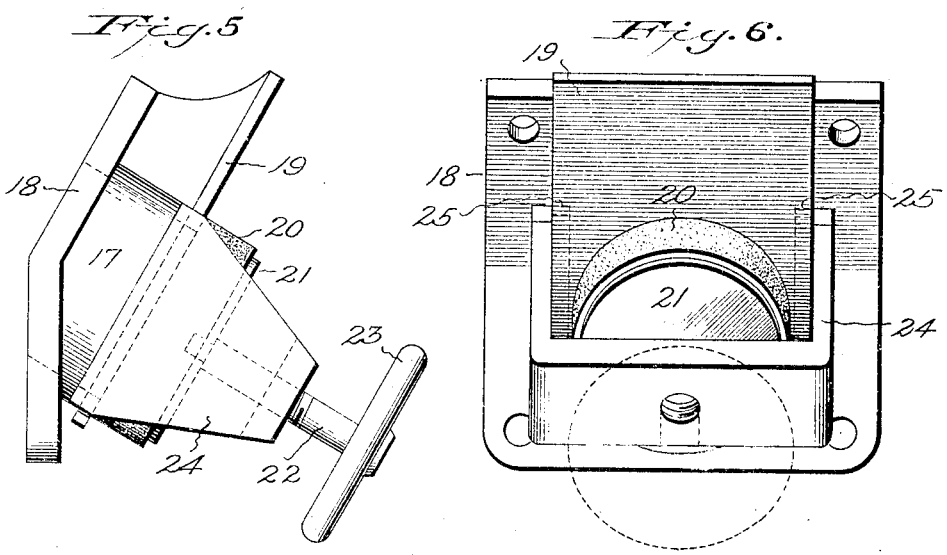

UNITED STATES PATENT OFFICE.

CHARLES L. BUCKINGHAM, OF DENVER, COLORADO, ASSIGNOR OF ONE-HALF TO ROBERT B. McCONNEY, OF DENVER, COLORADO.

FILTER FOR SEPARATING SOLUTIONS FROM ORE-PULP.

No. 871,860.  Specification of Letters Patent.  Patented Nov. 26, 1907.

Application filed January 9, 1907. Serial No. 351,511.

*To all whom it may concern:*

Be it known that I, CHARLES L. BUCKINGHAM, a citizen of the United States of America, residing at the city and county of Denver and State of Colorado, have invented a new and useful Filter for Separating Solutions from Ore-Pulp, of which the following is a specification.

My invention relates to improvements in filters, and particularly that type of filters which are adapted to filter solutions from ore pulp. And the objects of my invention are: First, to provide a filtering tank adapted to filter cyanid or other chemical solutions from ore pulps. Second, to provide a filtering tank adapted to continuously filter ore pulp solutions and separate the solution from the ore as a clear liquid. Third, to provide a simple, automatically-operating filtering tank that does not require power to operate it, and is inexpensive to construct, and requires but a small space in an ore treating mill. And fourth, to provide a simple means of removing water or solutions from ore pulp and delivering the pulp in a thickened condition better adapted for concentration or other treatment. I attain these objects by the mechanism illustrated in the accompanying drawings, in which:

Figure 1, is a longitudinal section of a filtering tank embodying my invention. Fig. 2, is a plan view thereof. Fig. 3, is an end elevation of the same. Fig. 4, is a vertical, transverse, sectional view on the line 4—4 of Fig. 1. Fig. 5, is a side elevation of a orm of discharge valve used in connection with the tank. And Fig. 6 is a front elevation of the same, the operating wheel and screw being shown in dotted lines.

Similar letters of reference refer to similar parts throughout the several views.

Referring to the drawings, the numeral 1, designates a tank which may be made of any desired shape, and may also be constructed of any suitable material, but I preferably make the tank V-shaped and of a length equal to several times its width at its widest portion, the length being governed somewhat by the fineness and character and volume of the ore-pulp flowing into it, but I have found in practice that a tank of from two and a half to three times its width works perfectly satisfactorily. I preferably construct the tank of wood, but if desired sheet iron or steel or any other suitable material may be used.

My filtering tank consists of a bed timber 2, which rests on and is set slightly into cross sills 3, which are placed under the bed timber at short distances apart and transversely across the bed timber, and are secured to it by vertical bolts 4. To the sides of this bed-timber I secure by bolts 5, the lower ends of side timbers 6, which extend upward from the bed timber at an outwardly diverging angle a distance equal to the height the tank is to be made, and the upper ends of these side timbers are connected by tie rods 7. Around the top edge of the tank are secured strips 8, which form a rim. Upon the inner faces of the side timbers 6 are secured tongue and groove planks 9, which are securely nailed or otherwise fastened to each other and to the side timbers, and these planks, with the side timbers, constitute the sides of the tank. Near the upper end of the tank, below the tie rods 7, are placed a number of screen frames 10, which rest on cleats 11, secured to the sides of the tank, and these filter frames are secured in the top of the tank against these cleats and against accidental displacement by wedges 12, which are driven between the tie rods and the frames. These filter frames are covered with a suitable filtering material, such as cloth, burlap, asbestos, or with a wire screen of any desired fineness of mesh, and the filtering or screening material is preferably secured to the top of the screen frames in any suitable manner.

At the head end of the tank, I form an ore pulp feed hopper 13, which is positioned above the end of the tank and is provided with a spout portion 14, which extends from the hopper down into the tank below the filtering medium. And at the opposite or discharge end of the tank, an overflow or discharge trough 15 is formed, the floor of which is arranged slightly above or about even with the filtering medium. Within the tank I place a series of transversely arranged ore deflectors 16, which may consist of thin sheets of metal or thin wooden partitions, the upper ends of which abut against the under sides of the rear ends of the frames 10, from which they project downward at an oblique angle of preferably about 30 degrees, their free ends extending towards the discharge end of the tank, and each deflector being long enough to extend a short distance beyond the filter frame, under which it is placed. I preferably make these ore deflectors in the form of filters or screens however, and have illustrated them as frames, covered with a suitable filtering medium, which is secured to them in any preferred manner. The object of these screen deflectors is to deflect the ore pulp, and thus prevent it from flowing up directly against the filtering medium, as it flows through the tank from its feed end to its discharge end, but at the same time to allow it to flow readily upward through the screens to the filtering medium.

At the bottom of the tank, I place discharge valves, which may be of any suitable type. I preferably use, however, a sliding gate valve which comprises an outlet hub 17, having a flange portion 18, at one end, which bolts over and around an aperture formed in the side of the tank, and at its opposite end a slideway 19, consisting of a plate which extends above and on each side of the hub. Upon the plate, and over the outlet aperture in the hub, is placed a resilient valve or stopper 20, upon which rests a metal disk 21. A threaded valve stem 22 is secured to the disk at one end and is provided with a hand wheel 23, and this stem is threaded to the cross piece of a yoke 24, which straddles the valve disk and the slideway, and its opposite ends are provided with introverted lugs 25, which extend behind the slideways, and the valve disk is tightened on its seat by turning the hand wheel and valve stem in the yoke in a direction to press the valve against its seat and to exert a pull on the yoke, which causes its guide-lugs to clamp against the slideways; thus securely clamping the valve disk to its valve seat and closing the valve; and when it is desired to open the valve the hand wheel is turned to unscrew the valve stem out of the yoke, which movement raises the valve disk and loosens the yoke on the slideways, and the operator slides the yoke and disk along the slideways to one side of the valve seat in case he desires to fully open the valve, or far enough to open the valve a quarter or half or three-quarters of its full discharging capacity, as desired, and then clamps the disk and yoke to the slideway until the tank has been emptied. Several valves may be placed along the bottom of the tank at equal distances apart, and thus enable the tank to be emptied quicker than through one valve.

The operation of my improved solution filtering tank is as follows: It is, as to its practical results, the same in both of the types of tanks herein illustrated, but the action of the ore pulp solution as it flows into and out of the two types of filtering tanks is different. I will first describe the action of the filtering tank shown in Figs. 1 to 4. The ore pulp solution, which is most generally a cyanid water ore pulp solution or a plain water ore pulp solution, which is water and finely crushed or pulverized ore mixed together into a flowing stream, enters the hopper from its source of supply through a spout 38 and flows through the hopper into the head end of the tank, and along the tank and fills it, and as the ore pulp solution flows the ore particles settle out of it onto the bottom of the tank, the heaviest settling first, and the lighter particles and especially the slimes portion, remaining in suspension are carried against the deflectors, as the inflowing current of ore pulp flows continuously into the tank, and are deflected downward towards the bottom of the tank, to which they finally settle, and allow the clearer solutions to rise up between the deflectors against the filtering material, which is preferably some suitable filtering fabric; especially is it a filtering material when a clear cyanid or water solution is desired; on the other hand if it is desired to separate the fine slimes product with the solutions, or even to separate the finer portion of the ore pulp with the solution from the coarser ore pulp, a wire cloth or a slotted wire screen may be used instead of the filtering material, and the solution flows through this filtering material if it is used, as a perfectly clear cyanid solution. When a filtering material is used, all of the slimes product and even the cloudy product of the slimes is left in the tank either adhering to the under side of the filtering material or settling gradually to the bottom of the tank. The clear solution as it filters up through the filtering medium flows to the discharge end of the tank and discharges therefrom through the overflow spout. The continuous flowing of the ore pulp solution fills the tank in time partially full of settled ore pulp, and when this ore pulp has accumulated along the bottom of the tank to near the lower ends of the deflectors the inflowing solution is cut off and the discharge valves are opened and the settled ore is washed out by a stream of water under pressure, which can be discharged into the tank by an attendant from a hose by first removing the filters or screens, which will very quickly wash the ore entirely out of the tank, after which the discharge valves are closed and the ore pulp solution is turned again into the tank. When, however, it is desired to refilter the settled ore pulp in the tank, the discharge valves are left partially open and a continuous stream of the settled ore sands, with as much of the solution as is desired, thus forming a thicker ore pulp, is allowed to continuously discharge from the valves, and this product, which contains a smaller per cent. of cyanid solution than that flowing into the tank, is mixed with a weaker solution of cyanid, and is run into and through a second tank, from which the settled ore sands may be allowed to continuously escape with a small portion of the solution, which is carried by the sands by saturation, and by being immersed in a body of solution, and this second tailings ore sand may be mixed with a still weaker solution and run into another or third tank, and be also filtered. Thus, by using two or three or more of my tanks in a series, the cyanid ore pulp solution may be separated from the ore pulp by these successive stages of filtration, and these filtered cyanid solutions are conveyed to zinc boxes and to electrical or other treatments where their values are extracted. It is often desired, however, to filter straight water, and other ore pulp solutions than cyanid, from stamp or Huntington and other type of ore crushing and pulverizing mills, and to separate the bulk of the water solution from the ore sands in order to reduce the amount of solution to just enough solution to form a concentrating ore pulp solution, and in such cases the watery ore pulp is run into the tank and the excess of water solution is filtered out of the ore pulp through the filtering medium, and the discharge valves are opened sufficiently to allow the settled ore sands to flow out of the tank together, with sufficient watery solution to form a suitable concentrating ore pulp, which is conveyed by suitable launders to concentrating tables for further treatment. These tanks can be made of a capacity to run for several days or a week or two without being discharged, and they do not require any attention, and can be made of any capacity, and require but little mill floor space and no power to operate them, and they very thoroughly separate clear solutions from cyanid or other ore-pulp solutions.

Having described my invention, what I claim as new and desire to secure by Letters Patent, is:

1. A filter for separating solutions from ore pulp, comprising a tank, a feed hopper at one end of said tank, a discharge spout at the opposite end of said tank, a filtering medium over the top of said tank, a plurality of ore pulp deflectors in said tank adapted to guide the ore pulp towards the bottom of said tank, and discharge valves in the bottom of said tank.

2. A filter for separating solutions from ore pulp, comprising a tank, a feed hopper at one part of said tank, a discharge member at another part of said tank, a filtering medium over said tank, filtering deflectors extending into said tank at a downward inclination in the direction of the flow, and suitable discharge valves in the bottom of said tank.

3. A filter for separating solutions from ore pulp, comprising a V-shaped rectangular tank of greater length than width, a feed hopper at one end of said tank adapted to feed ore pulp into its top end portion, a discharge spout at the opposite top end portion of said tank, a filtering medium extending over the top of said tank adapted to filter the solutions from the ore pulp flowing into said tank from said hopper, filtering deflecting plates extending at a downward angle into said tank from the under side of said filtering medium, downwardly in the direction in which the ore pulp flows along the tank from the hopper and up through the filtering medium to the discharge spout, and suitable ore discharge valves along the bottom of said V-shaped tank.

4. In a filter for separating solutions from ore pulp, the combination of the supporting timbers, the bed timber, the upwardly diverging side rib timbers secured to said bed, the transverse tie bolts at the top of the tank, the vertical strips extending from said supporting timbers to said side rib timbers, and the plank lining to said side rib timbers, with the filtering medium at the top of said tank, means for feeding ore pulp into said tank, means for discharging the filtered solutions from said tank, and suitable ore discharge valves in the bottom of said tank.

5. In a filter for separating solutions from ore pulp, the combination of the tank comprising the bed timber, the side ribs attached to said bed timber, the cross tie bolts, and the lining of the tank secured to said side ribs, with the filtering frames arranged to be set across the top of said tank, the solution discharge spout at the end of said tank, the inclined ore-pulp deflecting filters depending from said filtering frames, the feed hopper at the opposite end of said tank from said discharge spout, and the discharge valves.

6. In a filter for separating solutions from ore pulp, the combination of the V-shaped tank, having a feed hopper at one end, a discharge spout at its opposite end, a plurality of filtering screens extending across the tank, and arranged end to end, downwardly inclined deflecting filtering screens in said tank extending from said filtering screens, and a discharge valve in the bottom of said tank, comprising the flanged tubular portion secured to the discharge outlet of said tank, provided with a valve seat, and a slideway, a yoke fitting said slideway, a valve disk fitting said seat, a valve stem connected to said valve disk, and threaded through said yoke, and a hand wheel on said valve stem.

7. In a filter for separating solutions from ore pulp, the combination of a tank covered with filtering material, means for flowing ore pulp continuously into said tank and said filtering material being arranged to permit the solutions of said ore pulp to flow up through it, and said tank being arranged to permit the ore to settle in its bottom, means for conveying the filtered solutions from said filtering material and from said tank, and means including suitable valves arranged in the bottom of said tank for discharging the settled ore from said tank.

8. In a filter for separating solutions from ore pulp, the combination of a V-shaped tank, means for feeding ore into said tank, a series of removable filtering screens arranged in the top of said tank, means for supporting and for securing said screens in the top of said tank, an overflow spout adapted to convey the filtered product from said tank, and a suitable discharge valve in the bottom of said tank.

9. In a filter for separating solutions from ore pulp, the combination of the V-shaped tank, of the feed hopper, the overflow spout, and the discharge valve, with a plurality of removable filtering screens arranged to close the top of said tank, the cross-tie bolts extending across the top of said tank above said filtering screens, and the wedges arranged to fit between said tie bolts and said screens and secure said screens to said tank.

In testimony whereof I affix my signature in presence of two witnesses.

CHARLES L. BUCKINGHAM.

Witnesses:
 WM. TILTON,
 JOHN PUGHE.